July 17, 1956  C. A. GARTZKE  2,754,929
PNEUMATIC SEPARATOR

Filed Aug. 4, 1953  3 Sheets-Sheet 1

INVENTOR
CHARLES A. GARTZKE,
BY *Stone, Boyden & Mack*
ATTORNEYS

July 17, 1956  C. A. GARTZKE  2,754,929
PNEUMATIC SEPARATOR

Filed Aug. 4, 1953  3 Sheets-Sheet 3

INVENTOR
CHARLES A. GARTZKE,
BY *Stone, Boyden & Mack*
ATTORNEYS

United States Patent Office 2,754,929
Patented July 17, 1956

2,754,929

PNEUMATIC SEPARATOR

Charles A. Gartzke, Richmond, Va.

Application August 4, 1953, Serial No. 372,257

8 Claims. (Cl. 183—65)

This invention relates in general to improvements in apparatus for separating solid particles from an air stream and pertains particularly to means for separating particles of tobacco from a stream of air. To such an extent, the apparatus may be identified as an improved pneumatic separating means whereby the larger solid particles are trapped, withdrawn, from the air stream which which they are entrained.

Heretofore many structures have been designed for separating solid particles from an air stream. Some of those structures, although fairly efficient, have proved to be somewhat complicated and expensive. The device of the present invention is characterized by its simplicity and relatively low cost of manufacture.

A further advantage derived from the use of the separator of this invention resides in the fact that the filtering medium located within an outer casing is spaced from the walls of the outer casing so as to permit the movement of air freely and completely around the filter structure per se.

A still further advantage inherent to the device of the present invention is derived from the particular relation between the filter element and an enclosing wall provided with openings therethrough and through which openings the air passing through the filter medium is permitted to escape. Further advantageous features relate to the mounting of the filter screen and the mounting of the air discharge plates, which plates in their assembled relation comprise the wall which encloses the filter screen and through which wall the escaping air is permitted to pass. The mounting for the filter screen and for the perforated plates provides an important function. The plurality of plates are separately removable and other plates may be substituted to provide different ratios between the solid plate portion and the openings therein for the passage of air. Likewise the slideways for the plates is distinct from the slideway for the filter screen and hence all of these elements are separately removable.

The above and additional features and advantages of the apparatus of this invention will be set forth in greater detail in the following specification and claims when considered in connection with the accompanying drawings, in which:

Figure 1:
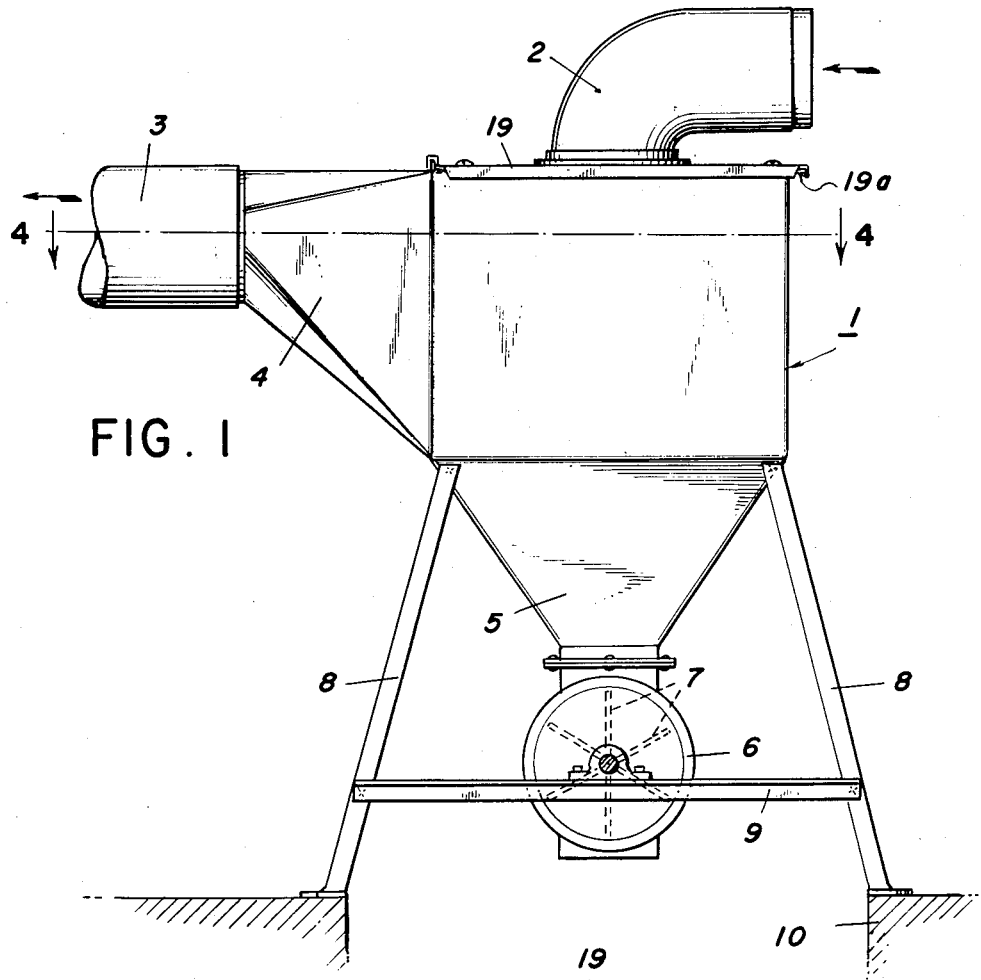
Figure 1 is a side elevation showing the separator mounted on a supporting base provided with intake and outlet pipes, and a discharge valve at the bottom.
Figure 2:
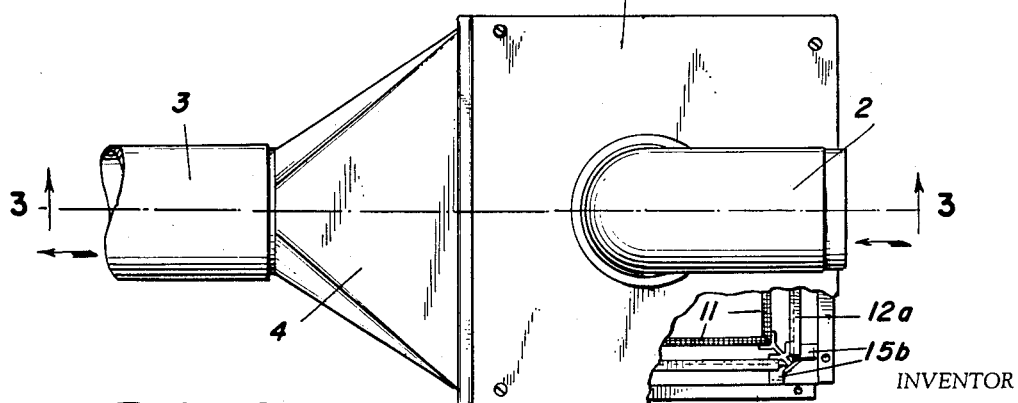
Figure 2 is a plan view of the structure shown in Figure 1, partly broken away to show the upper edges of the filter screens and air control plates.
Figure 3:
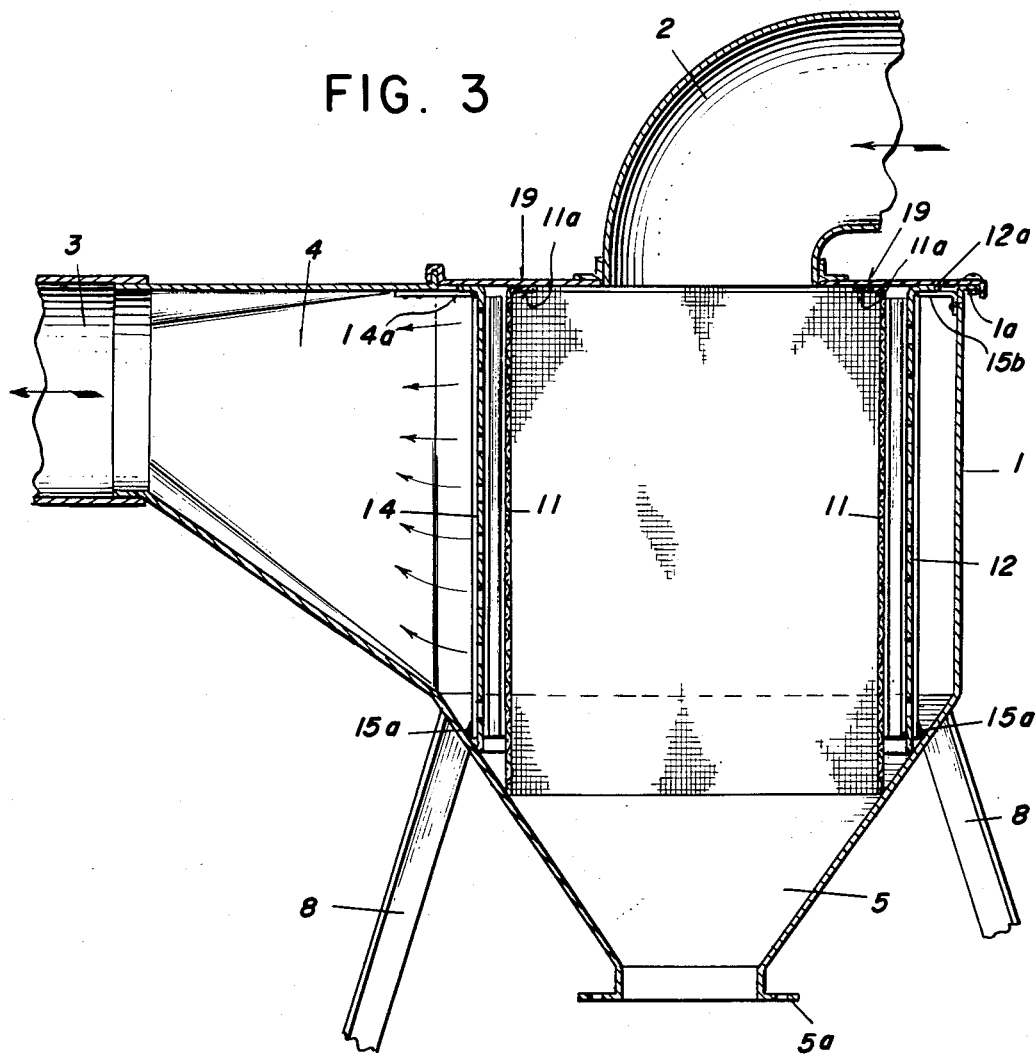
Figure 3 is a vertical section taken on the line 3—3 of Figure 2, looking in the direction of the arrows, the valve at the bottom having been removed.

Referring in detail to the several figures of the drawings, 1 indicates the casing in which the filter mechanism is housed. This casing is provided with three vertical side walls of substantially the same rectangular shape. From the fourth side of the casing, a duct leads to a discharge pipe, as will be shown. The intake pipe 2 leads into the upper portion of the casing so as to deliver air and solid particles entrained therewith into the space within a filter screen, as will be described. As shown in Figures 1, 2 and 3, the intake pipe 2 leads into the center and top of the casing. The outlet pipe is shown at 3 and as being coupled up to the casing by means of a duct having tapered conduit 4.

Extending downwardly from the side walls 1, the casing is provided with a tapered discharge chute or hopper having oblique side walls 5 leading to the housing 6 of a discharge valve having rotatable blades 7 whereby particles entrapped between the blades may be moved around to a position to be dumped without permitting air to enter or to flow outwardly freely.

The casing is mounted on a suitable supporting base by means of any suitable framework such as indicated by the uprights 8 and cross braces 9. The uprights 8 are indicated as mounted on a concrete base 10 of any suitable design.

Figure 4:
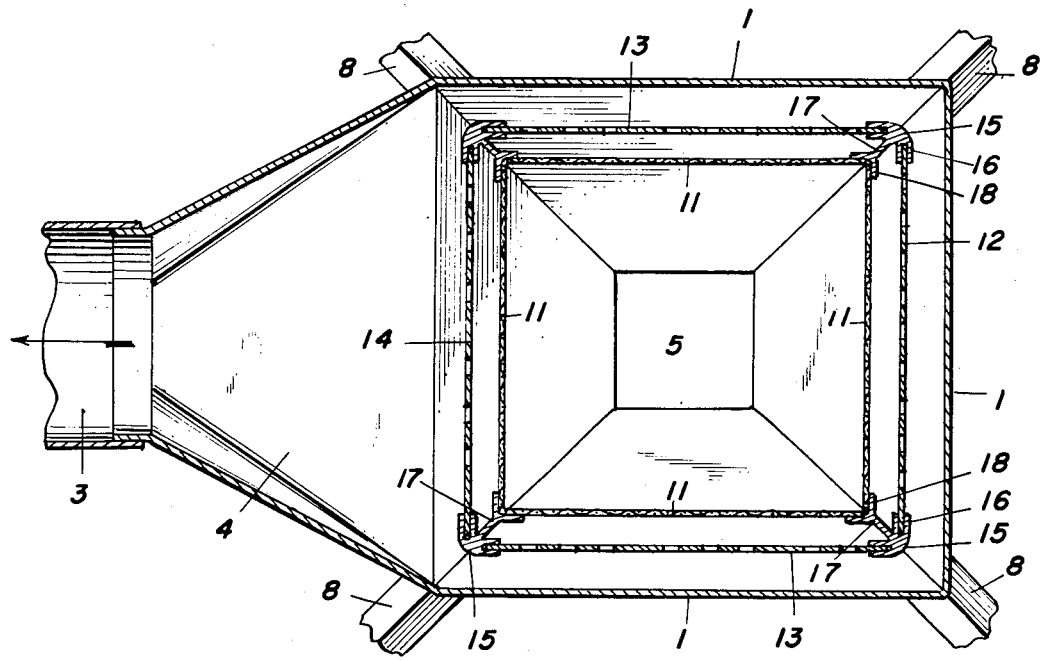
Figure 4 is a horizontal section taken on the line 4—4 of Figure 1 looking in the direction of the arrows.
Figure 5:
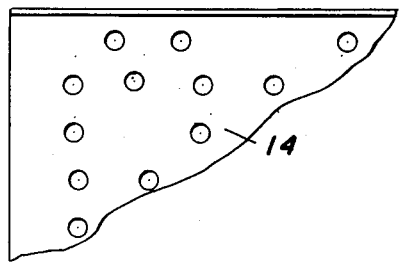
Figure 5 is a fragmentary side elevation of a portion of the air control plate at the discharge side of the filter mechanism.
Figure 6:
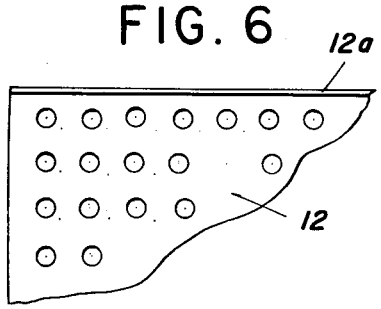
Figure 6 is a fragmentary side elevation of a portion of the air control plate at the side of the filter mechanism opposite to the plate shown in Figure 5.
Figure 7:
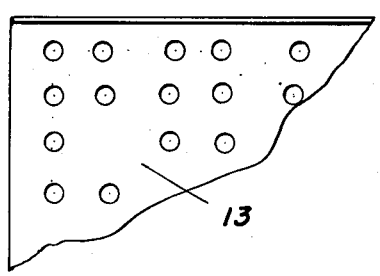
Figure 7 is a fragmentary side elevation of a portion of a discharge plate such as is used at the two opposite sides of the filter mechanism, thus in between the plates shown in Figures 5 and 6.

Within the casing 1, the filtering mechanism is positioned substantially centrally with respect to the several side walls. Referring in detail to Figures 3 and 4, it will be observed that the filtering mechanism includes a filtering screen 11 having four sides and that the lower edge of the screen 11 has a tight fitting engagement with the inner surface of the several walls of the chute 5, and that thus particles introduced through the pipe 2 within the center of the screen 11 will not be permitted to escape outwardly and upwardly to the discharge duct. Means for regulating the discharge of air through the filter screen 11 in its passage to the discharge pipe 3 is provided by means of air control plates 12, 13 and 14. These plates are spaced from and are substantially parallel to the four sides of the filter screen 11, as will be seen in Figures 3 and 4. The plate 12 is located on that side of the filter screen distant from the outlet opening. The two plates 13 are located alongside of the filter screen 11 and the plate 14 is at the discharge side of the filter screen 11. These plates are solid except for the perforations indicated respectively at 12ª, 13ª and 14ª. It will be noted that the openings shown in the plates 12, 13 and 14 are substantially the same in size but that there is a larger number of openings in plate 12 than in either of the side plates 13 or the plate 14. This is indicated diagrammatically by showing regularity and closeness of arrangement for the openings in plate 12 and correspondingly fewer openings in plate 13 and still fewer openings in plate 14, for the same respective area of the several plates. In short, it is one feature of this invention that the air should be permitted to circulate between the filter screen 11 and the several enclosing plates 12, 13 and 14, and that the air be permitted to escape through the perforated plates 12, and 13 and 14 to the space between those plates and the walls of the casing 1. By way of illustration, in a preferred form of the apparatus, the respective area of perforation in the plates 12, 13 and 14 may be in the ratios of 212 to 392 to 180, the area of openings in the side plates 13 being doubled by reason of the fact that two plates are involved, each plate having a respective ratio area of 196.

Paralleling the construction whereby the lower end of the filter screen 11 has a tight fit against the inner surface of the chute 5, so also do the lower edges of the plates 12, 13 and 14 engage the wall of the chute with a tight fit so as to preclude the movement of air between the plates and the chute.

The construction whereby the filter screen 11 and the perforated air control plates 12, 13 and 14 are mounted and held securely with respect to the casing, one will now be described. The upper end of the filter screen 11 is provided with an inwardly extending portion 11$^a$ which is a continuation of the material of the filter screen projecting laterally substantially as a narrow flange of filter screen material. This flange is useful when it is desired to insert the screen or remove it from the casing. Likewise the several perforated air control plates 12, 13 and 14 are provided with laterally extending flanges 12$^a$, 13$^a$ and 14$^a$, which project outwardly in substantially the same plane with the flange 11$^a$ of the filter screen.

Figure 8:
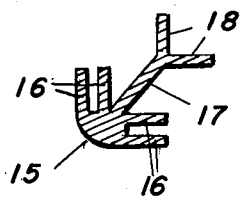
Figure 8 is an enlarged view of the guideway and supporting structure in which the filter screen and air control plates are mounted, one of these being used at each corner of the filtering mechanism.

Track means for precisely positioning the filter screen 11 and the perforated air control plates 12, 13 and 14 is provided by means of a special corner track mechanism, one of each of which is located at each corner of the screen and thus within each corner of the casing. Each track element includes a relatively rigid post 15 which extends from the inner surface of the wall of the chute 5 upwardly to a point adjacent the top of the casing 1. These posts are located in spaced relation to the corners of the casing. The bottom of the post is preferably welded to the inner surface of the chute 5 as at 15$^a$ and the upper end of the post is provided with braces 15$^b$ extending laterally from the post to the inner surface of the adjacent wall of casing 1. Each post 15 is provided with portions 16 extending at right angles and which portions are slotted vertically, thus providing guideways for the reception of the edge portions of the perforated plates 12, 13 and 14. Means for positioning the filter screen 11 is provided by an extension from the post 15 and which extension is indicated as a web 17 extending laterally and in between the angular portions 16 toward the center of the casing. At the extreme inner end of the web 17, lateral angular extensions 18 are provided so that each post 15 supports a right angle track formed by the extension 18 and which track is vertical reaching from the upper portion of the casing to the lower edge of the post 15 whereby the filter screen 11 may be guided in its vertical movement and held rigidly in position. In Figure 8, there is illustrated an enlarged detail of one of the posts 15 with its slotted guideways 16 and right angle track 18.

The arrangement shown in Figures 1, 2 and 3 provide for the intake pipe to discharge into the top of the casing and according to this arrangement the casing is provided with a cover plate 19 which is adapted to extend the full area of the casing and be secured to the casing side walls in any convenient manner. As shown in Figure 3, the casing side walls 1 are provided with a laterally outwardly extending short flange 1$^a$ to which the cover plate 19 may be secured by suitable screws or bolts.

At the lower end of the chute 5, there is a laterally extending flange 5$^a$ to which the outlet valve mechanism may be secured.

I claim:

1. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally, a valve at the lowermost portion of said bottom for the removal of solid particles, a filter structure located within said casing, said filter structure being spaced from the inner surfaces of the side walls of said casing for the free movement of air around and through said filter structure, said filter structure having interior substantially vertical walls of filter cloth extending as a continuous wall and having a tight engagement laterally of said valve with the top and inclined surface of said bottom of said casing against passage of particles therebetween, and a substantially vertical perforate exterior wall structure to control the passage of air from said filter structure and spaced from said interior wall and from the inner surface of the side wall of said casing and located between the filter cloth walls and the walls of said casing and having openings therethrough for the discharge movement of said air, said perforate exterior wall structure having a tight engagement laterally of said valve with the top and bottom of said casing against passage of particles therebetween, said filter structure being so mounted and positioned with respect to the point of entry of said intake pipe that the latter discharges into the space within said casing centrally of said filter structure, said vertical perforate exterior wall having a tight engagement with the top and bottom of said casing against passage of particles therebetween.

2. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally, a valve at the lowermost portion of said bottom for the removal of solid particles, a filter structure located within said casing, said filter structure being spaced from the inner surfaces of the side walls of said casing for the free movement of air around said filter structure, said filter structure having interior substantially vertical walls of filter cloth extending as a continuous wall and having a tight engagement laterally of said valve with the top and inclined surface of said bottom of said casing against passage of particles therebetween, and a substantially vertical perforate exterior wall structure to control the passage of air from said filter structure and spaced from said interior wall and from the inner surface of the side wall of said casing and located between the filter cloth walls and the walls of said casing and having openings therethrough for the discharge movement of said air, said filter structure being so mounted and positioned with respect to the point of entry of said intake pipe that the latter discharges into the space within said casing centrally of said filter structure, said casing top being removable and said filter structure being removable upwardly from said casing, said vertical perforate exterior wall having a tight engagement with the top and bottom of said casing against passage of particles therebetween.

3. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally a valve at the lowermost portion of said bottom for the removal of solid particles, a filter structure located within said casing, said filter structure being spaced from the inner surfaces of the side walls of said casing for the free movement of air around said filter structure, said filter structure having interior substantially vertical walls of filter cloth extending as a continuous wall and having a tight engagement laterally of said valve with the top and inclined surface of said bottom of said casing against passage of particles therebetween, and a substantially vertical perforate exterior wall structure to control the passage of air from said filter structure and spaced from said interior wall and from the inner surface of the side wall of said casing and located between the filter cloth walls and the walls of said casing and having openings therethrough for the discharge movement of said air, said filter structure being so mounted and positioned with respect to the point of entry of said intake pipe that the latter discharges into the space within said casing centrally of said filter structure, said perforate side wall structure having a tight engagement with the top and bottom of said casing against passage of particles and air therebetween, and the space between said filter cloth walls and said perforate wall being open, said vertical perforate exterior wall having a tight engagement with the top and bottom of said casing against passage of particles therebetween.

4. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally a valve at the lowermost portion of said bottom for the removal of solid particles, a filter structure located within said casing, said filter structure being spaced from the inner surfaces of the side walls of said casing for the free movement of air around said filter structure, said filter structure having interior substantially vertical walls of filter cloth extending as a continuous wall and having laterally of said valve a tight engagement with the top and inclined surface of said bottom of said casing against passage of particles therebetween, and a substantially vertical perforate exterior wall structure to control the passage of air from said filter structure and spaced from said interior wall and from the inner surface of the side wall of said casing and between the latter and the walls of said casing and having openings therethrough for the discharge movement of said air, said filter structure being so mounted and positioned with respect to the point of entry of said intake pipe that the latter discharges into the space enclosed by said walls of filter cloth, said perforate wall structure having a tight engagement with the top and bottom of said casing against passage of particles and air, therebetween, and said perforate wall structure including a plurality of separate wall panels each being separately removable upwardly when said casing top is removed.

5. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally a valve at the lowermost portion of said bottom for the removal of solid particles, a filter structure located within said casing, said filter structure being spaced from the inner surfaces of the side walls of said casing for the free movement of air around said filter structure, said filter structure having interior substantially vertical walls of filter cloth, a substantially vertical perforate exterior wall structure to control the passage of air from said filter structure and spaced from said filter cloth walls and between the latter and the walls of said casing and having openings therethrough for the discharge movement of air, said filter structure being so mounted and positioned with respect to the point of entry of said intake pipe that the latter discharges into the space enclosed by said walls of filter cloth, said filter cloth walls and said perforate wall structure having laterally of said valve a tight engagement with the top and bottom of said casing against passage of particles therebetween and spacing means for holding said filter structure in spaced relation to the inner surface of said casing side walls and secured to said top and said inclined walls of said bottom and extending vertically lengthwise of said walls of filter cloth.

6. Apparatus for separating particles from an air stream comprising a hermetically closed casing having substantially vertical imperforate side walls, a bottom and a top, an intake pipe leading into said casing at a point adjacent the top of said casing, an outlet pipe for air leading from one side of said casing, said bottom having walls inclined downwardly centrally a valve at the lowermost portion of said bottom for the removal of solid particles, a filter structure located within said casing, said filter structure being spaced from the inner surfaces of the side walls of said casing for the free movement of air around said filter structure, said filter structure having interior substantially vertical walls of filter cloth, a substantially vertical perforate exterior wall structure to control the passage of air from said filter structure and spaced from said filter cloth walls and between the latter and the walls of said casing and having openings therethrough for the discharge movement of air, said filter structure being so mounted and positioned with respect to the point of entry of said intake pipe that the latter discharges into the space enclosed by said walls of filter cloth, said filter cloth walls and said perforate wall structure having laterally of said valve a tight engagement with the top and inclined surface of said bottom of said casing against passage of particles therebetween, and spacing means for holding said filter cloth walls from said perforate wall structure and for spacing both said filter cloth walls and said perforate wall structure from said casing side walls and extending vertically lengthwise of both said filter cloth walls and said perforate wall structure and secured to said top and the inclined surface of said bottom.

7. In an apparatus for separating particles from an air stream a multi-sided structure having substantially vertical imperforate side walls extending in angular relation to each other, a bottom and a top, an intake pipe leading into said casing at a point adjacent the top of said casing, an outlet pipe for air leading from a side of said casing, a valve at the bottom of said casing for the removal of solid particles, a filter structure located within said casing and having walls paralleling the vertical imperforate walls, said filter structure being spaced from the inner surfaces of the side walls of said casing for the free movement of air around said filter structure, said filter structure having interior substantially vertical walls of filtering material joined at their vertical edges to provide corners, a substantially vertical perforate exterior wall structure to control the passage of air from said filter structure and spaced from said interior walls and between the latter and the walls of said casing, and having openings therethrough for the discharge of air, said walls of filtering material and perforate walls being in number and arrangement conforming to the number and arrangement of side walls of said casing, and each set of walls being in substantially parallel arrangement, said filter structure being so mounted and positioned with respect to the point of entry of said intake pipe that the latter discharges into the space enclosed by said walls of filter cloth, and means for mounting the said filter structure comprising braces extending inwardly from the casing side walls and located adjacent the corners formed by its side walls, a separate track structure supported by each brace, each track structure including a two sided vertical guideway each guideway at an angle to the other for the slidable reception of the lateral edges of adjacent perforate side walls, and said track structure including a track angular in cross section spaced inwardly from said slotted vertical guideways whereby the sides of said angular track constitute a guideway for the corners of said filter cloth member.

8. In an apparatus for separating particles from an air stream, a multi-sided structure having substantially vertical imperforate side walls extending in angular relation to each other, a bottom and a top, an intake pipe leading into said casing at a point adjacent the top of said casing, an outlet pipe for air leading from a side of said casing, a valve at the bottom of said casing for the removal of solid particles, a filter structure located within said casing and having walls paralleling the vertical imperforate walls, said filter structure being spaced from the inner surfaces of the side walls of said casing for the free movement of air around said filter structure, said filter structure having interior substantially vertical walls of filtering material joined at their vertical edges to provide corners, a substantially vertical perforate exterior wall structure to control the passage of air from said filter structure and spaced from said interior walls and between the latter and the walls of said casing, and having openings therethrough for the discharge of air, said walls of filtering material and perforate walls being in number and arrangement conforming to the number and arrangement of the side walls of said casing, and each set of walls being in substantially parallel arrangement, said filter structure being so mounted and positioned with respect to the point of entry of said intake pipe that the latter discharges into the space enclosed by said walls of filter cloth, and means for mounting the said filter structure comprising braces extending inwardly from the casing side walls and located adjacent the corners formed by its side walls, a track structure supported by each brace, each track structure including a two sided vertical guideway each guideway at an angle to the other for the slidable reception of the lateral edges of adjacent perforate side walls, and said track structure including a track angular in cross section spaced inwardly from said slotted vertical guideways whereby the sides of said angular track constitute a guideway for the corners of said filter cloth member, said track structure including a support extending from adjacent braces, between said adjacent slotted guideways to said angular track whereby the latter and the filter cloth walls are rigidly held with respect to said perforate walls and said casing.

References Cited in the file of this patent

UNITED STATES PATENTS

| | | |
|---|---|---|
| 569,203 | Hunt | Oct. 13, 1896 |
| 1,426,196 | Jordahl | Aug. 15, 1922 |
| 1,916,907 | Sargent | July 4, 1933 |
| 2,530,112 | Arnold | Nov. 14, 1950 |
| 2,631,728 | Popp | Mar. 17, 1953 |

FOREIGN PATENTS

| | | |
|---|---|---|
| 4,968 | France | Sept. 20, 1905 |
| | (1st Addition to No. 339,841) | |
| 104,842 | Great Britain | Mar. 22, 1917 |
| 242,388 | Great Britain | Nov. 12, 1925 |
| 412,656 | France | July 10, 1910 |
| 415,378 | Germany | June 19, 1925 |
| 1,023,275 | France | Dec. 24, 1952 |